United States Patent [19]

Wüchner et al.

[11] 4,158,841
[45] Jun. 19, 1979

[54] METHOD AND APPARATUS FOR THE CONTROL OF THE SAFETY DISTANCE OF A VEHICLE RELATIVE TO PRECEDING VEHICLES

[75] Inventors: Erwin Wüchner, Grossheppach; Ulrich Heitmeyer, Rosbach von der Höhe; Walter Kostelezky, Stuttgart, all of Fed. Rep. of Germany

[73] Assignee: Daimler-Benz Aktiengesellschaft, Fed. Rep. of Germany

[21] Appl. No.: 796,869

[22] Filed: May 16, 1977

[30] Foreign Application Priority Data

May 26, 1976 [DE] Fed. Rep. of Germany ....... 2623643

[51] Int. Cl.$^2$ .............................................. G01S 9/46
[52] U.S. Cl. .................................................. 343/7 VM
[58] Field of Search ....... 343/7 VM, 112 CA, 12 MD

[56] References Cited

U.S. PATENT DOCUMENTS

| 3,752,582 | 8/1973  | Troll et al.      | 343/9     |
| 3,772,694 | 11/1973 | Sato et al.       | 343/7 VM  |
| 4,011,563 | 3/1977  | Robbi             | 343/7 VM  |
| 4,016,566 | 4/1977  | Fujiki            | 343/7 VM  |
| 4,039,782 | 8/1977  | Burckhardt et al. | 343/7 VM  |

Primary Examiner—Maynard R. Wilbur
Assistant Examiner—Lawrence Goodwin
Attorney, Agent, or Firm—Craig & Antonelli

[57] ABSTRACT

A method and apparatus for the control of the safety distance of a vehicle with respect to preceding objects wherein various measurements and controls are effected so as to provide control magnitudes for enabling prevention of a collision of the vehicle with an object. The various measurements and controls which may be effected include the determination whether a detected object lies within a maximum inference-free measuring distance from the vehicle, the changing of the pivot angle of an antenna of the vehicle and possibly also the opening angle of the transmitted beam independence on the steering wheel deflection and/or traverse acceleration of the vehicle, suppressing large extended objects by a separate measurement of the distance of the vehicle to the object and relative velocity of the vehicle with respect to the object by comparison of the measure change and distance with a calculated change in distance or the measured relative velocity with a calculated relative velocity, preferring an object recognized as a preceding vehicle among all objects, and combining in accordance with the maximum inference-free measuring distance values of at least one of the measured distance of the vehicle to the object, the measured relative velocity of the vehicle with respect to the object and the measured velocity of the vehicle to provide the control magnitudes.

28 Claims, 7 Drawing Figures

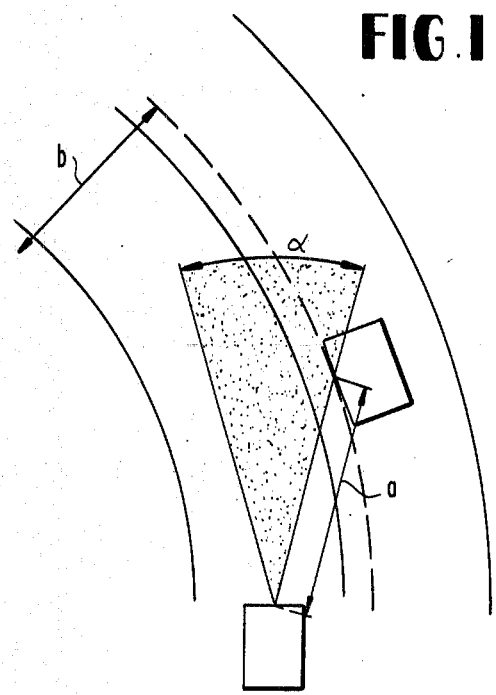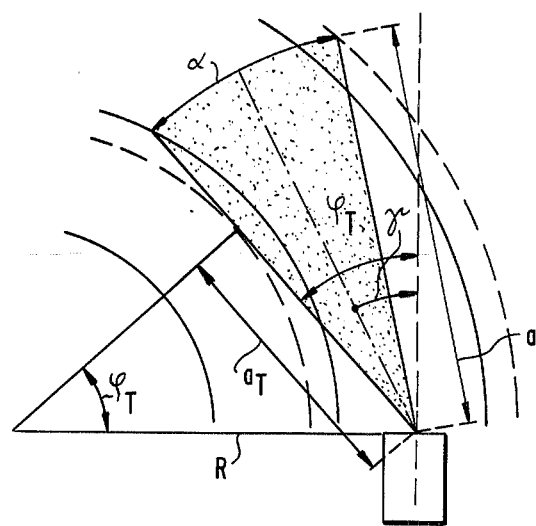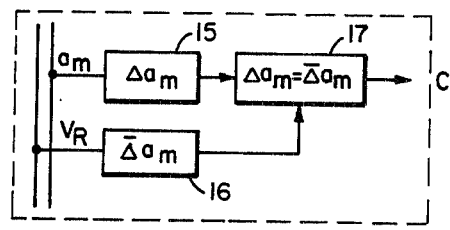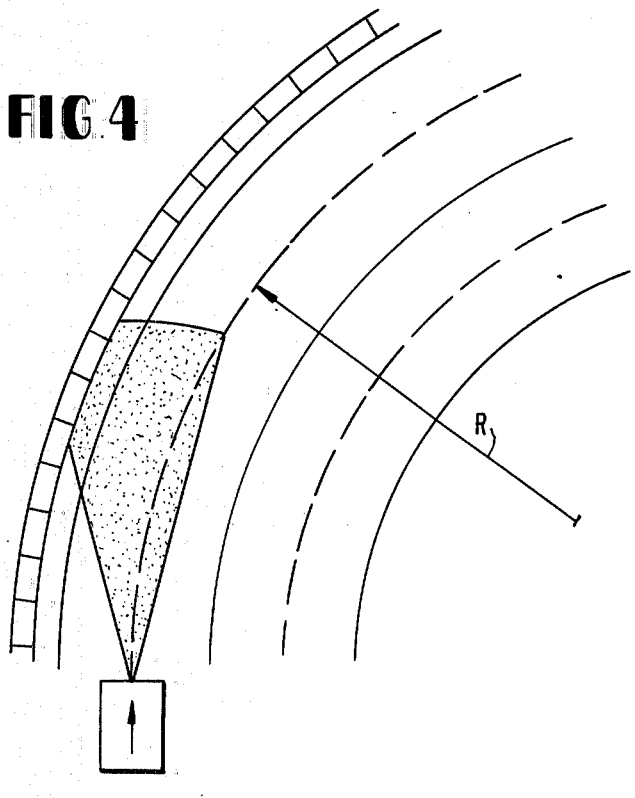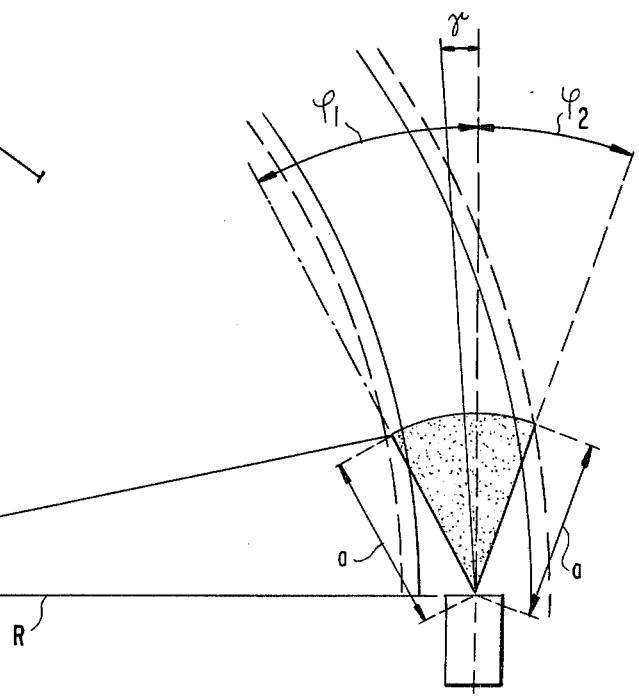

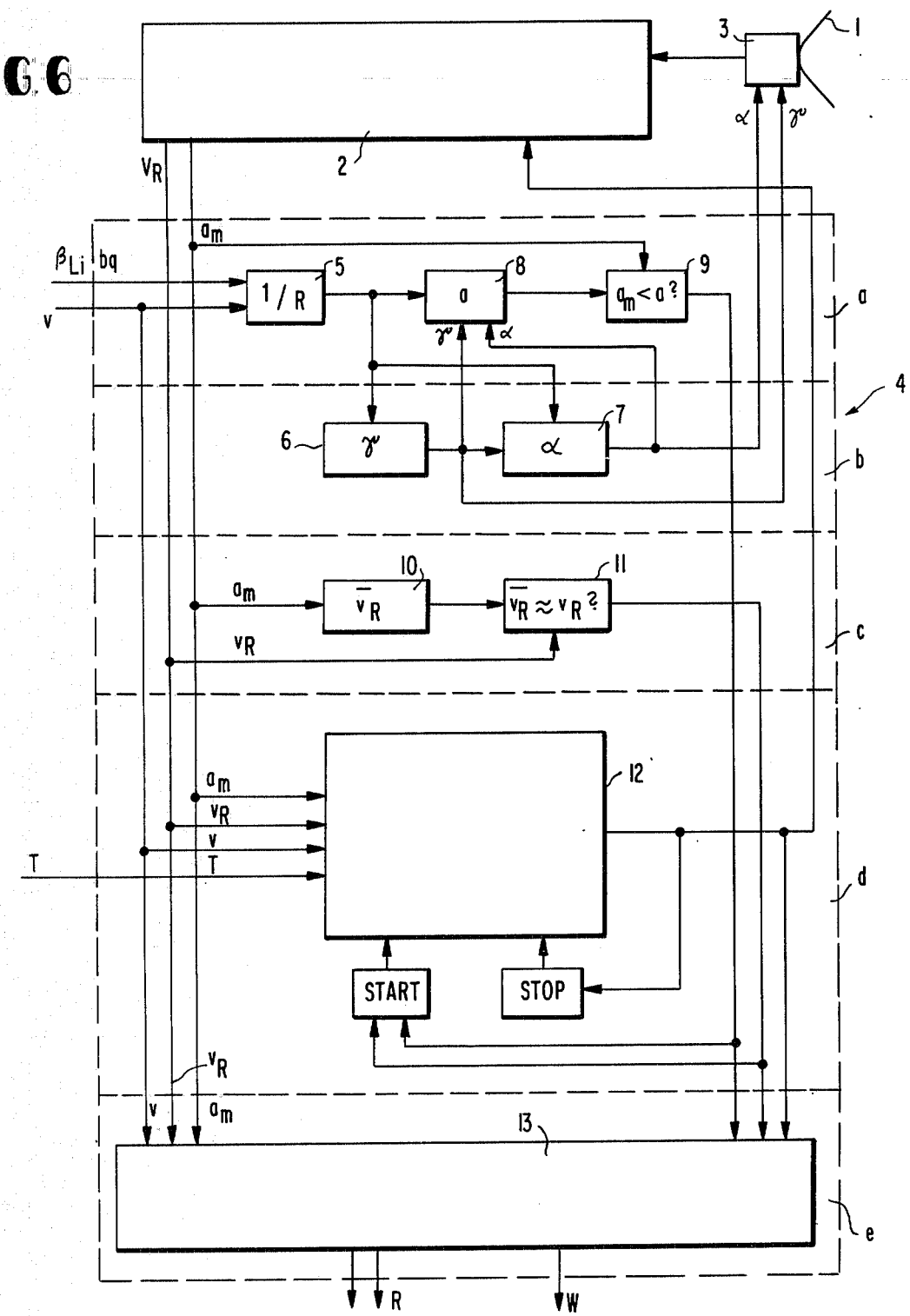

METHOD AND APPARATUS FOR THE CONTROL OF THE SAFETY DISTANCE OF A VEHICLE RELATIVE TO PRECEDING VEHICLES

The present invention relates to a method for the self-sufficient control of the safety distance of a vehicle to vehicles driving in front thereof, especially for trackless vehicles with a distance and/or relative velocity measurement. The present invention also relates to an apparatus for carrying out this method.

Such apparatus measure either the distance to the possible collision partner and obtain by differentiation the relative velocity (for example, pulse radar) or the direct distance and relative velocity (for example, pulse Doppler-radar). Apparatus are also used which determine "simultaneously" the distances and relative velocity with respect to several targets or objects (for example, multi-target radar). By taking into consideration the velocity of one's own vehicle, it is possible to indicate when falling below a safety distance to be required (warning apparatus) or the necessary brake deceleration of one's own vehicle can be determined and possibly a braking of the vehicle can be initiated automatically (distance control).

If installations of the aforedescribed type have not found wide use in the road traffic, even though many places concern themselves intensively with the development of such apparatus, then this is still due in the first instance to fundamental difficulties.

Tests carried out heretofore have indicated that a number of measuring methods are suitable to determine the distance and relative velocity with respect to possible collision partners. Especially radar-measuring methods enable a recognition of targets also under unfavorable weather conditions (snow, rain fog). It is also possible in principle to recognize not only motor vehicles, but also pedestrians and objects.

Since apparatus of the type described are able to detect in motor vehicles always only a predetermined area located in front of one's own vehicle, not only vehicles or obstacles in one's own lane will be detected but also vehicles in adjacent lanes or objects at the edge of the road lane. Especially in curves the danger of false alarms exists, i.e., of erroneous warnings of the driver or of unjustifiable interactions into the brake system.

It is therefore the task of the present invention to provide a method, by means of which the control of the safety distance is possible with the elimination of false alarms, which adapts in particular the measuring distance and the measuring range to the road conditions, suppresses large interference targets and can utilize as "guide magnitude" vehicles driving in front with approximately the same velocity. Additionally, it is the task of the present invention to provide an apparatus for carrying out this method.

The underlying problems are solved according to the present invention in that (a) it will be determined by means of the steering wheel deflection and/or the transverse acceleration, possibly taking into consideration also the pivot and opening angle of the antenna, whether a detected target is disposed inside of the maximum disturbance-free or interference-free measuring distance, and/or (b) the pivot angle of the antenna and possibly the opening angle of the transmitted beam is changed dependent on the steering wheel deflection and/or on the transverse acceleration, and/or (c) large or extended targets are suppressed by a separate measurement of distance and relative velocity and by a comparison of (1) the measured change in distance with the change in distance calculated by integration of the relative velocity or (2) of the measured relative velocity with the relative velocity calculated by differentiation of the measured distance, and/or (d) of all targets, a target recognized as "preceding vehicle" which drives in front of one's own vehicle, is preferred, and that the values determined according to (a) to (d) are combined with the measured distance, the measured relative velocity and the measured own velocity into control magnitudes for the vehicle and/or into a warning signal for the driver.

A disturbance-free or interference-free operation of a distance control in different driving situations can be achieved by a combination of these four individual criteria, even though each criterion signifies already by itself also an improvement of existing conditions.

Thus, the criterion (a) covers by itself only the drive, for example, in a curve with a fixed radius. During entry into and exit out of a curve (clotoids) the boundary of the disturbance-free or interference-free space necessarily has to be insufficient.

The same may be said for criterion (b) as was said for criterion (a). The alignment of the pivotal radar lobe is optimally possible only for an elongated curve. A slight erroneous alignment cannot be avoided during short periods of time during entry into and exit out of a curve. In the se cases, criterion (c) is nonetheless effective. This criterion admittedly presupposes that the relative velocity is determined independently of distance (Doppler evaluation), but is practically effective with every stronger curvature of the road as regards the always existing guide planks and anti-glare protective fences.

While the criteria (a) to (c) aim essentially at interference elimination in the horizontal direction, i.e., for interference targets to the left and to the right adjacent one's own lane, also an interference elimination in the vertical direction, i.e., for targets above the road lane is possible by means of criterion (d).

Accordingly, it is an object of the present invention to provide a method and apparatus for the control of the safety distance of the vehicle to preceding vehicles which avoids by simple means the aforementioned shortcomings and drawbacks encountered in the prior art.

Another object of the present invention resides in a method and apparatus for the control of the safety distance of a vehicle to preceding vehicles which eliminates the danger of erroneous indications, especially while driving through curves.

A further object of the present invention resides in a method and apparatus of the type described above which suppresses large interference targets while utilizing preceding vehicles, driving at about the same velocity, as preferred guide magnitudes.

Still a further object of the present invention resides in a method and apparatus for controlling the safety distance of a vehicle with respect to preceding vehicles which readily adapts itself to the changing road conditions as regards measuring distance and measuring range.

Another object of the present invention resides in a method and apparatus for the control of the safety distance of a vehicle to preceding vehicles which is simple in construction, yet operates reliably and avoids incorrect indications.

These and other objects, features and advantages of the present invention will become more apparent from the following description when taken in connection with the accompanying drawing which shows, for purposes of illustration only, one embodiment in accordance with the present invention, and wherein:

FIG. 1 is a schematic top plan view on a curved road section and illustrating in principle the aforementioned criterion (a) of the present invention;

FIG. 2 is a schematic top plan view on a curved road section and illustrating in principle the aforementioned criterion (b) of the present invention;

FIG. 3 is a further schematic top plan view on a curved road section and illustrating in principle the criterion (b) according to the present invention;

FIG. 4 is a schematic top plan view on a curved road section and illustrating in principle the criterion (c) of the present invention;

FIG. 5 is a schematic side elevational view of a road travelled by vehicles and illustrating in principle the criterion (d) of the present invention;

FIG. 6 is a schematic block diagram of an apparatus in accordance with the present invention for the control of the safety distance of a vehicle with respect to the preceding vehicles; and FIG. 7 is a schematic block diagram of another embodiment of the part c apparatus of FIG. 6.

Referring now to the drawing wherein like reference characters are used throughout the various views to designate like parts, the aforementioned criteria (a) to (d) will now be described in detail by reference to FIGS. 1 through 5.

CRITERION (a)

When driving through a curve, FIG. 1, the maximum disturbance-free or interference-free measuring distance a is limited, i.e., one suppresses targets at distances $a_m > a$. If one measures the transverse acceleration and the velocity or the steering wheel deflection, then the curvature $1/R$ of the curve (R=radius of curvature) can be determined. If one starts with a vehicle driving in the center of its lane, then the maximum disturbance-free or interference-free measuring distance a can be determined taking into consideration the opening angle $\alpha$ of the "measuring beam" as well as an average lane width b.

In case the transmitter points in the direction of the vehicle longitudinal axis, the following equation applies:

$$a = -|R| \sin \alpha/2 + \sqrt{R^2 \sin^2 \alpha/2 + b \cdot |R|} \quad (1)$$

For determining the value of R, the transverse acceleration $b_q$ in conjunction with the own velocity v is suitable especially at higher velocities, whereas the steering wheel deflection $\beta_L$ offers itself at lower velocities.

If one dispenses with a measurement of the transverse acceleration or of the steering wheel deflection and therewith with a determination of the road curvature, then one should start with the minimum radius which occurs on the roads to be travelled. One is then able to determine the disturbance-free or interference-free measuring distance by means of equation (1), below which no false alarms occur with certainty. Thus, for example, on Autobahns (highways) one has to reckon with minimum radii of about 600 m, whence a disturbance-free or interference-free measuring distance of 40 meters will then result for $\alpha=2.4°$ and $b=4.15$ meters.

CRITERION (b)

Installations are known, according to which headlights or measuring devices are pivotally arranged in motor vehicles and, when driving through a curve, pivot into the curve in dependence on the steering wheel deflection or on the transverse acceleration. The pivot angle is thereby, for example, so selected that at a given velocity a stationary or fixed object is still timely recognized, i.e., it is still possible to brake with the theoretical possible deceleration under the existing road condition. Such pivot conditions improve the viewing of the curve, however, they do not supply optimum disturbance or interference conditions. If, for example, a driver in a vehicle equipped with a warning apparatus does not react with full-braking, when a fixed obstacle occurs, then it frequently leads to an impact or collision accident.

It is therefore advantageous to so select the pivot angle $\gamma$ in curves that a sufficient curve inspection or viewing is achieved with simultaneous maximum disturbance-free or interference-free measuring distance. In that case, a minimum in false alarms occurs in curves.

For that purpose, in narrower curves (on high-speed roads), one has to pivot up to the inner edge of the curve (FIG. 2).

The following is true exactly for the pivot angle:

$$\gamma = \phi_T - \alpha/2 \text{ for } R > 0 \text{ with } \phi_T = \arccos \frac{|R| - b/2}{|R|} \quad (2)$$

$$\gamma = -\phi_T + \alpha/2 \text{ for } R < 0 \quad (3)$$

where $\phi_T$ is a tangential angle.

One can equate $\phi_T$ with a good approximation as follows:

$$\phi_T = (180/\pi) \cdot \sqrt{(b/R)} \quad (4)$$

In wider curves (for example, $|R| > 2500$ meters for $\alpha=2.4°$), one must not pivot up to the inner edge of the curve, but only so far that the same distances result to the left and right edge (FIG. 3).

The pivot angle can be calculated from this condition and the following applies $$\gamma = k/R \text{ for } |R| > 2500 \text{ meters} \quad (5)$$

Thus, one obtains, for example, for $\alpha=2.4$ and $b=4.15$ meters, $k=2978$ degrees /m where k is a constant.

For a pivotal antenna, criterion (a) can also be applied. With a pivoted measuring beam, the disturbance-free or interference-free measuring distance a can be obtained as follows:

$$a = -|R| \sin (\alpha/2 - \gamma) + \sqrt{R^2 \sin^2 (\alpha/2 - \gamma) |R| b} \quad (6)$$

A possible simplification is as follows:

$$\sin (\alpha/2 - \gamma) = (\pi/180) \cdot (\alpha/2 - \gamma) \quad (7)$$

A suppression or false alarm can also take place in that case by a comparison of the distance $a_m$, determined with respect to an obstacle, with the disturbance-free or interference-free measuring distance a. Targets with $a_m < a$ are located on one's own road lane.

If the opening angle $\alpha$ of the transmitter beam is changed, for example, dependent on the steering wheel deflection or on the transverse acceleration, then the disturbance-free measuring distance can be "optimized" to a certain extent in curves.

CRITERION (c)

A large part of the false alarms can be traced back to fixed targets at the edge of the road lanes, especially to guide planks and anti-glare protective fences in curves as well as to bridges and road signs. There now exists a possibility, at least for "large targets" past which one drives, such as guide planks and anti-glare protective fences, and also tunnels, to differentiate the same from stationary vehicles or obstacles, toward which one drives, if the distance and the relative velocity are obtained separately (i.e. the relative velocities are not obtained by differentiation of the distances).

A typical case in that connection is driving past a guide plank or an anti-glare protective fence in a curve (FIG. 4).

Irrespective of whether the "measuring beam" is pivoted into the curve or not, a measuring installation (for example, pulse Doppler radar) indicates one or several (multi-target radar) relative constant distances when driving through a curve with constant radius of curvature. The relative velocity is practically identical with the driving velocity (fixed target).

If one drives toward an obstacle standing in one's own lane, then the distance decreases continuously corresponding to the driving velocity, in contrast to the guide planks, where the distances remain relatively constant.

If at a time $t_1$, a distance $a_1$ and a relative velocity $v_{R1}$ is determined and at a later point of time $t_2$, a distance $a_2$ and a relative velocity $v_{R2}$ is determined, then the following must apply (corresponding to the fundamental relationship between distance change and (relative) velocity):

$$\Delta a = a_1 - a_2 = -\int_{t_1}^{t_2} v_R dt \approx v_{R2}t_2 - v_{R1} \cdot t_1 \quad (8)$$

or for $$t_2 \longrightarrow t_1$$

$$\frac{\Delta a}{\Delta t} = \frac{a_1 - a_2}{t_2 - t_1} \approx v_R \quad (9)$$

The above formulation applies exactly with an analog measurement of distance and relative velocity. If the distance and relative velocity are measured digitally (corresponding to predetermined accuracies), then a decision whether it involves a target corresponding, for example, to a guide plank or possibly an obstacle in one's own lane, is possible only when the distance change to be expected which is calculated according to equation (8), is larger than or equal to the smallest distance change which can be measured digitally. If at this instant the change in distance to be expected does not occur, then it involves with certainty a false alarm.

Consequently, with digital measuring methods of the distance, the points of time of distance changes to be expected are determined. If no distance change occurs at these points of time, the determined measured values are suppressed. With analog measuring methods or with methods which determine the distance very accurately, one differentiates suitably the measured distances and compares the velocity obtained in this manner with the measured velocity.

It should be noted that this method is not applicable only to fixed targets, i.e., for driving velocities v = relative velocity $v_R$, but also for $v_R \neq v$, which can be used particularly advantageously for the suppression of false alarms which occur if one passes slower-moving vehicles, for example, in curves.

In particular, the possibility exists with the described method to suppress brief interferences or disturbances, i.e., interferences or disturbances of short duration, because the measured distances are followed always over a predetermined period of time given by the relative velocity and the accuracy of the measured values, before a measured value acceptance takes place for calculating, for example, the safety distance.

CRITERION (d)

The possibility exists by the use of this criterion that at least in those cases in which a driver follows a preceding vehicle for a "longer period of time," a drastic reduction of the false alarm rate can be achieved. Prerequisite therefor is, as will become more apparent hereinafter, that the measuring apparatus is not limited to measure only the nearest target.

The heretofore known distance-measuring installations which were conceived for use in road traffic, dispose of a fixed search mode which is characterized in that one always determines distance and relative velocity to the nearest target, in some cases also to the next to the nearest target. This inflexible search mode requires that disturbance or interference targets such as, for example, bridges, trigger automatically a false alarm when they are detected by the measuring beam at a shorter distance than the preceding vehicle (FIG. 5).

Corresponding to the methods of tracking used by the military, a flexible search modus can be so developed that a target with priority is preferredly measured. This may be, for example, a preceding vehicle, behind which one has driven already for a certain period of time.

Such a method presupposes that the apparatus is capable to recognize again the same target. This, however, can be attained very readily if one takes into consideration that the vehicles, as a rule, within a predetermined search time, can carry out only maximally occurring changes of the distance $\Delta a_m$ and of the relative velocity $\Delta v_R$ which can be calculated beforehand. The maximally occurring changes of the distance and of the relative velocity are obtained during a search time T initially on the basis of the measured or maximum possible decelerations or accelerations $b_{max}$. If one starts with a maximum deceleration of the preceding vehicle of $-8$ m/s$^2$ and a maximum acceleration of 5 m/s$^2$ of the following vehicle, then one obtains for the maximally occurring relative velocity changes during the search period (if one ignores at first an impact):

$$v_R(t) - v_R(t+T) = \Delta v_R = b_{max} \cdot T; b_{max} = -8 \text{ m/s}^2 - 5 \text{ m/s}^2 \quad (10a)$$

A maximally occurring distance change during the search period results therefrom which is equal to:

$$a_m(t) - a_m(t+T) = \Delta a_m = -\tfrac{1}{2} b_{max} T^2 \quad (10b)$$

For the case that the preceding vehicle accelerates with 5 m/s² and the following vehicle decelerates with −8 m/s², the following is true:

$$v_R(t) - v_R(t+T) = \Delta v_R = -b_{max} \cdot T \quad (11a)$$

$$a_m(t) - a_m(t+T) = \Delta a_m = \tfrac{1}{2} b_{max} T^2 \quad (11b)$$

The same target should therefore be searched during the period of time t+T within a range predetermined by the equations (10) and (11).

If no target exists in the aforementioned range, then the target is either no longer detected or it has led to an impact. Then a target should be searched having $v_R = v$ (driving velocity) and $a_m(t) - a_m(t+T) \leq v \cdot T$. If also no target exists in this range, then one should search for a new target (under certain circumstances only the nearest one).

The above criterion is particularly suited for the suppression of disturbance or interference targets with a clearly different relative velocity to the followed target.

As regards the start of the target tracking, certain limiting conditions are feasible. Thus, for example, acceptance into the target tracking after a predetermined tracking time or after approximation to an absolutely disturbance-free or interference-free distance (compare criterion (a)).

FIG. 6 illustrates a schematic block diagram of an apparatus in accordance with the present invention, utilizing well-known, conventional logic circuits that form no part of the present invention and therefore are not described in detail herein. A conventional installation 3 for pivoting the antenna and for changing the transmitted beam as well as a conventional computer unit generally designated by reference numeral 4 are coordinated to a conventional radar apparatus consisting of transmitter and antenna 1 and of a conventional signal-evaluating circuit 2 for determining the measured distance $a_m$ and the measured relative velocity $v_R$.

The computer unit 4 consists of five parts a to e of which the parts a to d are coordinated to the criteria (a) to (d) and part e represents a control unit which determines from the measured values and from the decisions of the individual criteria, the control magnitudes and warning signals.

A curvature computer 5 exists in the first decision unit a, which calculates the curvature 1/R of the road from the steering wheel deflection $\beta_L$ or from the transverse acceleration $b_q$ and the own velocity v. This value is at first applied to part b, which includes a pivot-angle computer 6 and an opening-angle computer 7 of conventional type and in which the pivot angle $\gamma$ of the antenna 1 and the opening angle $\gamma$ of the transmitter beam are calculated. The two values $\gamma$ and $\alpha$ are applied to the antenna in order to adjust the same correspondingly and also back to the first decision unit a where they are fed as inputs together with the curvature, to a measuring distance computer 8 which determines therefrom (by the use of equations (1) to (7) the maximum disturbance-free or interference-free measuring distance a. All of the targets detected by the antenna are compared with this maximum disturbance-free measuring distance a in the following first comparison unit 9 and it will be decided, whether or not they lie within the measuring range determined by $\alpha$ and $\gamma$. All targets located outside are suppressed as disturbance or interference targets. Part c includes a second decision unit, consisting of a differentiating element 10, in which corresponding to equations (8) and (9), the relative velocity $\overline{v}_R$ is calculated from the measured distance $a_m$ of a target and is compared in a following second comparison unit 11 with the measured relative velocity $v_R$ as shown in FIG. 6 or consisting of a measured change in distance element 15, an integrating element 16, in which corresponding to equations (8) and (9), the change in distance $\overline{\Delta a}_m$ is calculated from the relative velocity $v_R$ and is compared in a following comparison unit 17 with the measured change in distance $\Delta a_m$ as shown in FIG. 7. It will be decided therein whether the two values are or are not different. A target-tracking unit 12 is contained in part d, to which are fed as inputs the measured values of the distance $a_m$ and of the relative velocity $v_R$ as well as the own velocity v and the search time T and which determines corresponding to equations (10) and (11), whether or not the target involves a preceding vehicle. The target-tracking unit 12 will be started in the illustrated embodiment, when the target lies inside of the measuring range and is not a large (disturbance or interference) target. If it is determined that it involves a preceding vehicle, then this is transmitted to the signal evaluation circuit 2 in order that this target be tracked preferredly. If it does not involve a preceding vehicle, then the target-tracking unit 12 is again stopped and will be started again only with a new target. The decisions of the first and second comparison units 9 and 11 as well as of the target-tracking unit 12 are fed together with the measured values $a_m$, $v_R$ and v as inputs to the control unit 13 present in the part e.

The safety distances required for the individual measures are calculated in this control unit 13 from the measured values—for example, an interaction into the drive, for example, by a fuel reduction must take place earlier than the slight actuation of the brakes, and the latter again must take place earlier than an emergency braking—and are compared with the measured distance $a_m$, whereupon when dropping below these safety distances, the warning signals W and/or the control magnitudes R are released for the fulfillment of their task while taking into consideration the decisions of the comparison units and of the target-tracking unit.

It is also readily feasible within the scope of the present invention to so conceive this method and the apparatus that one drives at a certain distance behind a preceding vehicle, i.e., the control of this distance. Similarly, it is feasible within the scope of the present invention to adapt the velocity of one's own vehicle to the maximum disturbance-free measuring distance, i.e., to obtain an automatic reduction of one's own velocity in curves, etc.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for the control of the safety distance of a vehicle with respect to preceding objects, which vehicle is equipped with measuring means for measuring at least one of distance and relative velocity, comprising the following steps (a) through (e):
  (a) determining whether a detected object lies within a maximum interference-free measuring distance from the vehicle,
  (b) changing at least the pivot angle of an antenna of a transmitter of the vehicle dependent on at least one of steering wheel deflection and transverse acceleration of the vehicle,
  (c) determining extended objects which are to be suppressed by a separate measurement of the distance of the vehicle to the object and of the relative velocity between the vehicle and the object by comparing one of (i) measured distance change with a calculated distance change or (ii) measured relative velocity with a calculated relative velocity,
  (d) preferring among all objects, an object recognized as "preceding vehicle", and
  (e) combining in accordance with the maximum interference-free measuring distance values of at least one of the measured distance of the vehicle to the object, the measured relative velocity between the vehicle and the object and the measured velocity of the vehicle to provide control magnitudes for enabling prevention of a collision of the vehicle with the object.

2. A method according to claim 1, characterized in that the step of determining whether a detected object is located inside the maximum disturbance-free measuring distance takes into consideration the pivoting-angle and opening angle of the antenna of the transmitter.

3. A method according to claim 2, characterized in that in addition to the change of the pivot angle of the antenna, also the opening angle of the transmitter beam is changed according to step (b) in dependence on at least one of steering wheel deflection and transverse acceleration.

4. A method according to claim 1, characterized in that in accordance with step (c), the calculated change in distance is obtained by integration of the relative velocity or the calculated relative velocity is obtained by differentiation of the measured distance.

5. A method according to claim 1, characterized in that in accordance with step (e), the measured distance of the vehicle to the object, the measured relative velocity between the vehicle and the object and the measured velocity of the vehicle are combined to provide the control magnitudes.

6. A method according to claim 1, characterized in that step (a) includes determining whether a detected object lies within the maximum interference-free measuring distance from the vehicle by means of at least one of steering wheel deflection and transverse acceleration of the vehicle.

7. An apparatus for the control of the safety distance of a vehicle with respect to preceding objects, which apparatus comprises at least one of distance and relative velocity measuring means, including
  first means utilizing at least one of steering wheel deflection and transverse acceleration of the vehicle for determining whether a detected object is located inside a maximum interference-free measuring distance from the vehicle,
  second means for changing the pivot angle of an antenna of a transmitter of the apparatus in dependence on at least one of steering wheel deflection and transverse acceleration,
  third means for determining extended objects to be suppressed including separate measuring means for measuring distance of the vehicle to the object and relative velocity between the vehicle and the object and comparing means for comparing one of measured distance change and measured relative velocity with one of calculated distance change and calculated relative velocity, and
  fourth means for preferring among objects, an object recognized as preceding vehicle, and further including
  fifth means for combining in accordance with the maximum interference-free measuring distance values of at least one of the measured distance of the vehicle to the object, the measured relative velocity between the vehicle and the object and the measured velocity of the vehicle to provide control magnitudes for enabling prevention of a collision of the vehicle with the object.

8. An apparatus according to claim 7, characterized in that the first means for determining whether a detected object lies inside the maximum interference-free measuring distance includes means taking into consideration the pivot and opening angle of an antenna forming part of the distance-measuring means.

9. An apparatus according to claim 7, characterized in that the second means changes the pivot angle of the antenna and also the opening angle of the transmitted beam in dependence on at least one of steering wheel deflection and transverse acceleration.

10. An apparatus according to claim 7, characterized in that the third means determines extended objects to be suppressed by comparing the measured distance change with the calculated distance change determined by integration of the relative velocity.

11. An apparatus according to claim 7, characterized in that the third means compares the measured relative velocity with the relative velocity calculated by differentiation of the measured distance.

12. An apparatus according to claim 7, characterized in that the measuring means includes radar means operable to determine the distance to objects loaded within the measuring range and the relative velocity between said objects and the vehicle, said radar means being operatively connected with a computer means forming part of at least some of said first-through-fourth means, said computer means having inputs to which are fed measured distances, relative velocities, velocity of the vehicle and at least one of steering wheel deflection and transverse acceleration as well as search period and being operable to compute therefrom the control magnitudes.

13. An apparatus according to claim 12, characterized in that the control magnitudes are operable to control at least one of an antenna of the radar means, adjusting members of a drive means of the vehicle and brakes of the vehicle.

14. An apparatus according to claim 13, characterized in that the control magnitudes are operable to produce warning signals for the driver.

15. An apparatus according to claim 12, characterized in that the computer means includes a first decision means having a curvature computer means which computes the road curvature from at least one of steering wheel deflection and transverse acceleration and from the velocity of the vehicle, a measuring distance computer means which computes the maximum interference-free measuring distance from the road radius and at least one of pivot and opening angle, and a first comparison means which decides whether or not a detected object lies inside of the maximum interference-free measuring distance.

16. An apparatus according to claim 15, characterized in that the computer means includes a pivot angle computer means which determines from the radius of curvature, the optimum pivot angle of the antenna in relation to the vehicle longitudinal axis.

17. An apparatus according to claim 16, characterized in that the computer means includes an opening angle computer means which determines from the radius of curvature and the pivot angle the opening angle of the transmitted beam.

18. An apparatus according to claim 15, characterized in that a second decision means is provided in the computer means which includes a differentiating element that determines from measured distances of the object the relative velocity thereof and which includes a second comparison means which compares the calculated relative velocity with the measured relative velocity.

19. An apparatus according to claim 15, characterized in that a second decision means is provided in the computer means which includes an integrating element which determines from the measured relative velocity of the object the distance thereof and which includes a second comparison means which compares the calculated distance with the measured distance.

20. An apparatus according to claim 15, characterized in that the computer means includes an object-tracking means which determines whether the changes of the relative velocity and of the distance of a detected object remain within predetermined limits and which, when this is the case, causes the radar means to track this object preferredly, and means for starting the object-tracking means when the object lies inside the maximum interference-free measuring distance and represents no extended interference object and for stopping the object-tracking means when the object exceeds the predetermined limits.

21. An apparatus according to claim 18, characterized in that the computer means includes a computer unit with inputs, to which are fed the relative velocity and the distance of the object, the velocity of the vehicle and the decisions from the first and second comparison means as well as of a object-tracking means and which is operable to calculate therefrom the safety distances necessary for an interaction of the drive means of the vehicle or for an actuation of the brakes and which further determines on the basis of the decision, the points of time for the response to the control magnitudes.

22. An apparatus according to claim 19, characterized in that the computer means includes a computer unit with inputs, to which are fed the relative velocity and the distance of the object, the velocity of the vehicle and the decisions from the first and second comparison means as well as of a object-tracking means and which is operable to calculate therefrom the safety distances necessary for an interaction of the drive means of the vehicle or for an actuation of the brakes and which further determines on the basis of the decision, the points of time for the response to the control magnitudes.

23. An apparatus according to claim 12, characterized in that the computer means includes a pivot angle computer means which determines from the radius of curvature, the optimum pivot angle of the antenna in relation to the vehicle longitudinal axis.

24. An apparatus according to claim 12, characterized in that the computer means includes an opening angle computer means which determines from the radius of curvature and the pivot angle the opening angle of the transmitted beam.

25. An apparatus according to claim 12, characterized in that a decision means is provided in the computer means which includes a differentiating element that determines from measured distances of the object the relative velocity thereof and which includes a second comparison means which compares the calculated relative velocity with the measured relative velocity.

26. An apparatus according to claim 12, characterized in that a decision means is provided in the computer means which includes an integrating element which determines from the measured relative velocity of an object the distance thereof and which includes a second comparison means which compares the calculated distance with the measured distance.

27. An apparatus according to claim 12, characterized in that the computer means includes an object-tracking means which determines whether the changes of the relative velocity and of the distance of a detected object remain within predetermined limits and which, when this is the case, causes the radar means to track this object preferredly, and means for starting the object-tracking means when the object lies inside the maximum interference-free measuring distance and represents no extended interference object and for stopping the object-tracking means when the object exceeds the predetermined limits.

28. An apparatus according to claim 12, characterized in that the computer means includes a computer unit with inputs, to which are fed the relative velocity and the distance of the object, the velocity of the vehicle and the decisions from the first and second comparison means as well as of an object-tracking means and which is operable to calculate therefrom the safety distances necessary for an interaction of the drive means of the vehicle or for an actuation of the brakes and which further determines on the basis of the decision, the points of time for the response to the control magnitudes.

* * * * *